United States Patent
Maresh et al.

(10) Patent No.: US 10,693,857 B2
(45) Date of Patent: *Jun. 23, 2020

(54) SINGLE KEY AUTHENTICATION METHOD

(71) Applicant: INTERNATIONAL BUSINESS MACHINES CORPORATION, Armonk, NY (US)

(72) Inventors: Mark E. Maresh, Wake Forest, NC (US); Colm Nolan, Meath (IE); Juan F. Vargas, Cary, NC (US); Michael J. Whitney, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/251,387

(22) Filed: Jan. 18, 2019

(65) Prior Publication Data

US 2019/0158479 A1 May 23, 2019

Related U.S. Application Data

(63) Continuation of application No. 15/364,858, filed on Nov. 30, 2016, now Pat. No. 10,237,258.

(51) Int. Cl.
*H04L 29/06* (2006.01)
*G06F 21/36* (2013.01)

(52) U.S. Cl.
CPC .............. *H04L 63/08* (2013.01); *G06F 21/36* (2013.01); *H04L 63/107* (2013.01)

(58) Field of Classification Search
CPC ... H04L 63/08; H04L 63/107; H04L 63/0861; G06K 7/1413; G06K 7/1417; G06K 7/1421; G06K 7/1426; G06K 7/1434; G06K 7/1439; G06F 21/31; G06F 21/32; G06F 21/36
See application file for complete search history.

(56) References Cited

U.S. PATENT DOCUMENTS 6,614,914 B1  9/2003 Rhoads
6,836,554 B1  12/2004 Bolie
(Continued)

OTHER PUBLICATIONS

List of IBM Patents or Patent Applications Treated as Related; Date Filed: Feb. 26, 2019, 2 pages.
(Continued)

*Primary Examiner* — Hosuk Song
(74) *Attorney, Agent, or Firm* — Cantor Colburn LLP; Tihon Poltavets

(57) ABSTRACT

Systems, methods, and computer-readable media are disclosed for obtaining authenticated access to a service provider system, or more specifically, to a user account maintained on the service provider system, using a single key authentication mechanism. This mechanism includes generating an authentication image that includes user-generated content, user application-generated content, and service provider-generated content; sending the authentication image to the service provider system, which is configured to authenticate access to the user account based at least in part on the authentication image; and receiving an indication as to whether access to the user account has been authenticated.

17 Claims, 12 Drawing Sheets

(56) References Cited

U.S. PATENT DOCUMENTS

| | | | |
|---|---|---|---|
| 7,156,289 B2* | 1/2007 | Silverbrook | G06K 7/14 |
| | | | 235/375 |
| 7,475,246 B1 | 1/2009 | Moskowitz | |
| 7,995,196 B1* | 8/2011 | Fraser | G06K 9/00577 |
| | | | 356/71 |
| 8,127,345 B2* | 2/2012 | Gregg | G06F 21/335 |
| | | | 726/4 |
| 8,745,403 B2 | 6/2014 | Petrovic | |
| 8,947,197 B2 | 2/2015 | Craymer et al. | |
| 9,137,020 B1* | 9/2015 | Fraser | G06K 9/00577 |
| 9,213,931 B1 | 12/2015 | Annan | |
| 9,280,684 B1* | 3/2016 | Kragh | G06F 16/245 |
| 9,374,227 B2* | 6/2016 | Suominen | G06F 21/64 |
| 10,237,258 B2* | 3/2019 | Maresh | H04L 63/08 |
| 2006/0156385 A1 | 7/2006 | Chiviendacz | |
| 2008/0224823 A1 | 9/2008 | Lawson et al. | |
| 2010/0043062 A1 | 2/2010 | Alexander et al. | |
| 2014/0115679 A1 | 4/2014 | Barton et al. | |
| 2017/0329944 A1 | 11/2017 | Satyavarapu et al. | |
| 2018/0150626 A1 | 5/2018 | Maresh et al. | |
| 2018/0152428 A1 | 5/2018 | Maresh et al. | |

OTHER PUBLICATIONS

List of IBM Patents or Patent Applications Treated as Related; Date Filed: Jan. 24, 2019, 2 pages.

* cited by examiner

SINGLE KEY AUTHENTICATION METHOD

DOMESTIC PRIORITY

This application is a continuation of U.S. patent application Ser. No. 15/364,858, filed Nov. 30, 2016, the disclosure of which is incorporated by reference herein in its entirety.

BACKGROUND

A variety of different types of authentication mechanisms are known for restricting and authenticating access to a service or a system. These authentication mechanisms may include username and password combinations, authentication tokens, or the like. Certain types of authentication mechanisms may require a user to define tokens, patterns, and/or pin numbers to further authenticate an account. The aforementioned types of authentication mechanisms suffer from a number of drawbacks, technical solutions to which are described herein.

SUMMARY

In one or more example embodiments of the disclosure, a method for authenticating access to a service provider system is disclosed. The method includes sending, by a user application, an authentication image to the service provider system, and receiving, by the user application, an indication from the service provider system that access to a user account has been authenticated based at least in part on the authentication image. The authentication image includes first data generated in response to user input, second data generated by the user application, and third data generated by the service provider system.

In one or more other example embodiments of the disclosure, a client device for authenticating access to a service provider system is disclosed. The client device includes at least one memory storing computer-executable instructions and at least one processor configured to access the at least one memory and execute the computer-executable instructions to perform a set of operations. The operations include sending, by a user application executing on the client device, an authentication image to the service provider system, and receiving, by the user application, an indication from the service provider system that access to a user account has been authenticated based at least in part on the authentication image. The authentication image includes first data generated in response to user input, second data generated by the user application, and third data generated by the service provider system.

In one or more other example embodiments of the disclosure, a computer program product for authenticating access to a service provider system is disclosed that includes a non-transitory storage medium readable by a processing circuit, the storage medium storing instructions executable by the processing circuit to cause a method to be performed. The method includes sending an authentication image to the service provider system, and receiving an indication from the service provider system that access to a user account has been authenticated based at least in part on the authentication image. The authentication image includes first data generated in response to user input, second data generated by the user application, and third data generated by the service provider system.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
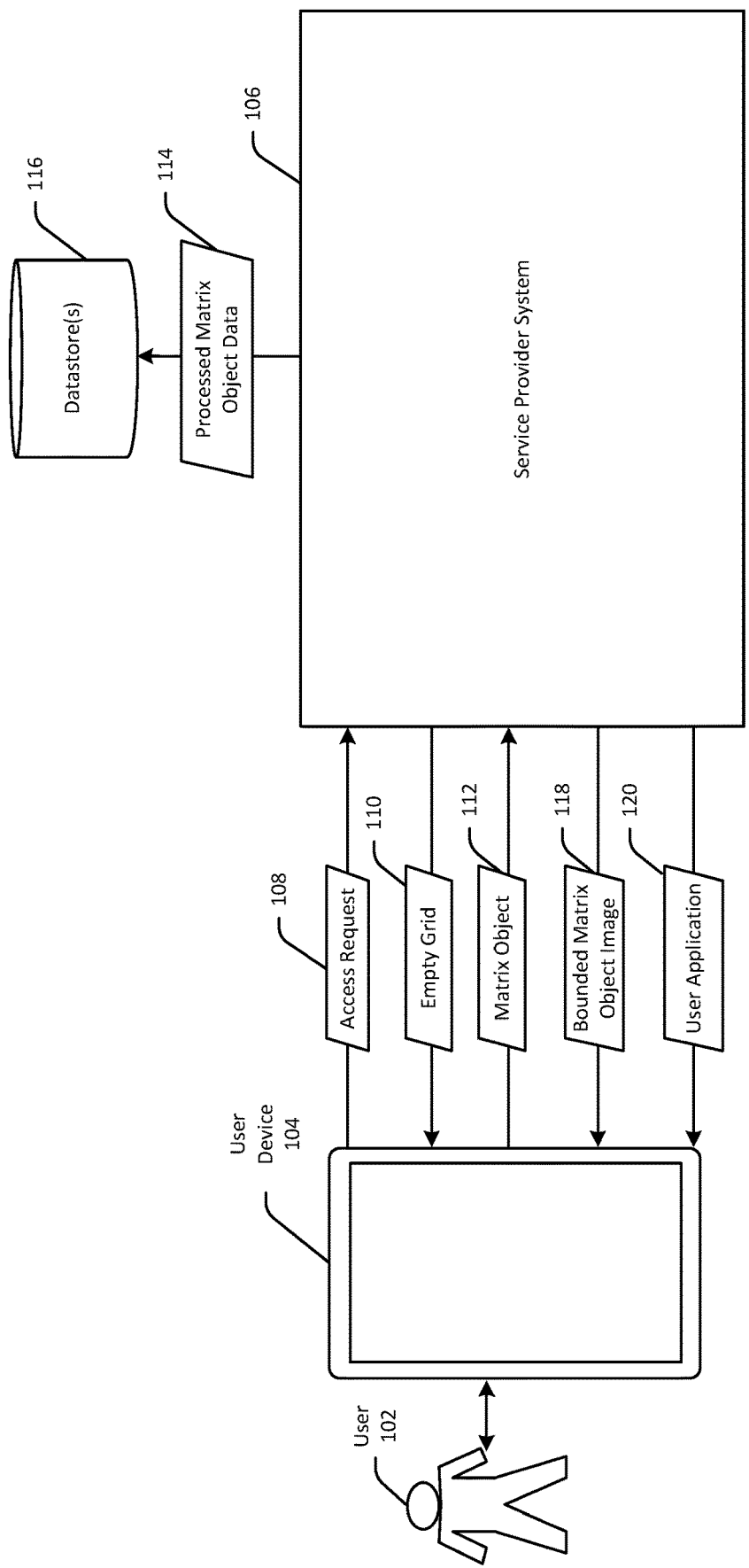
FIGS. 1A-1B are block diagrams that schematically depict a single key authentication mechanism in accordance with one or more example embodiments of the disclosure.

Example embodiments of the disclosure include, among other things, systems, methods, computer-readable media, techniques, and methodologies for authenticating access to a service provider system, or more specifically, to a user account maintained on the service provider system, using a single key authentication mechanism. This mechanism may include generating an authentication image that includes user-generated content, user application-generated content, and service provider-generated content, and using the authentication image to authenticate access to a user account.

In certain example embodiments, a user device may send an access request to a service provider system. In response to receiving the access request, the service provider system may provide the user device with access to an empty grid of selectable cells. For example, the user device may access a portal on the service provider system, and the empty grid may be presented to a user via a user interface of the user device. A user may then select some subset of the cells to form a matrix object. In certain example embodiments, a selected cell may be associated with a particular binary value (e.g., a 0 or 1) and an unselected cell may be associated with the opposing binary value. In this manner, the matrix object may be representative of a sequence of bits.

The user device may send the matrix object to the service provider system, which may validate the matrix object against one or more requirements. The service provider may also add data to the matrix object. For example, the service provider system may add a sequence of bits representing a service provider identifier, a sequence of bits representing a date, a sequence of bits representing a time, and/or a sequence of bits representing a geo-location identifier of the user device or the service provider system. These sequences of bits may be represented by combinations of selected and unselected cells that are combined with the matrix object.

In addition, in certain example embodiments, boundary indicators may be added to the matrix object. For example, a boundary indicator may be added to each corner of the matrix object. A boundary indicator may take the form of a 4-cell grouping that includes a combination of selected and/or unselected cells representative of a particular value. For example, a boundary indicator may be a 4-cell grouping in which each cell represents the value 1, in which case, the boundary indicator would represent the binary number 1111 (or the value 15 in base 10 notation). In certain example embodiments, one of the boundary indicators may be used to indicate orientation of the matrix object. For example, one of the boundary indicators may be a 4-cell grouping representing a different value than what is represented by the other boundary indicators. By distinguishing one boundary indicator from the others, the boundary indicator representing a different value can serve as an indicator for where reading of the matrix object data should begin. It should be appreciated that the boundary indicators may be any cell size and may represent any suitable value.

By adding the boundary indicators and the other types of data described above to the matrix object, a bounded matrix object image may be formed. The bounded matrix object image may serve as a key for the user and the service provider. The bounded matrix object image, or more specifically, the data encoded therein, may be stored in association with a user account on the service provider system. In storing the bounded matrix object image, the data encoded by the matrix object may be stored separately (or otherwise differentiated via a tag or label) from the service provider-generated content. Further, the different portions of the service provider-generated content (e.g., the service provider identifier, the datestamp, the timestamp, the geo-location identifier, the boundary indicators, etc.) may be similarly stored separately or otherwise distinguished from one another. The service provider may also send the bounded matrix object image to the user device for storage locally on the user device.

In certain example embodiments, during initial user account setup, a user application may be downloaded to the user device. For example, the user application may be downloaded from a portal or website of the service provider system. At the time of download, a user may be provided with the capability to select an algorithm logic that can be used to generate a digital imprint signature. Alternatively, a default algorithm logic may be used. The selected algorithm may be embedded into the code of the user application and downloaded to the user device for subsequent authentication.

The user application code may be launched on the user device to initiate access to the service provider system. Upon launch, the user application may send a request to the service provider system for a background image and a code. The code may be a sequence of numbers and/or characters. Upon receipt of the background image and code from the service provider system, the bounded matrix object image may be retrieved from local storage on the user device and integrated with the background image. In certain example embodiments, the bounded matrix object image may be overlaid on the background image via a drag-and-drop user operation. In addition, the digital imprint signature algorithm logic may be executed using the code provided by the service provider system to generate a digital imprint signature. The user application may then add, combine, or otherwise integrate the digital imprint signature to the bounded matrix object image. For example, the digital imprint signature may be represented by a particular sequence of selected and unselected cells that may be added to a bottom portion of the bounded matrix object image between boundary indicators. The digital imprint signature may correspond to a particular sequence of binary values.

The combination of the bounded matrix object image, the digital imprint signature, and the background image may be referred to herein as an authentication image and may serve as a key for authenticating access to a user account maintained on the service provider system. The user application may send the authentication image to the service provider system, and upon receipt, the service provider system may determine, based at least in part on the authentication image, whether access to a user account should be granted or denied.

In particular, the service provider system may determine whether the authentication image satisfies various requirements for authentication. More specifically, the service provider system may determine whether the background image in the authentication image matches the background image that was previously sent to the user application. If a match is determined, a first requirement for authentication may be met. In addition, the service provider system may utilize the boundary indicators to determine which portion of the authentication image corresponds to the matrix object and which portion corresponds to the digital imprint signature. Upon determining and reading the digital imprint signature in the authentication image, the service provider system may compare it to an expected digital imprint signature from executing the algorithm logic on the code that was previously sent to the user application. If a match is determined, a second requirement for authentication may be met. The service provider system may also read the matrix object to determine the sequence of bits represented by the matrix object and compare the sequence of bits to matrix object data stored in association with user accounts to determine whether the read matrix object data matches stored matrix object data for a user account. If a match is found, a third requirement for authentication may be met. It should be appreciated that, in certain example embodiments, additional or fewer requirements may need to be met to authenticate the user with respect to a user account.

If all requirements for authentication are met, the service provider system may grant the authenticated user access to the user account. On the other hand, if one or more requirements are not satisfied, the user may be denied access. An indication of the grant or denial of access may be sent from the service provider system to the user application.

Example embodiments of the disclosure provide various technical features, technical effects, and/or improvements to technology. For instance, example embodiments of the disclosure provide the technical effect of reducing the likelihood that a user account is compromised. This technical effect is achieved at least in part by the technical features of an authentication mechanism described herein that utilizes an authentication key/image to authenticate access to a user account, where the authentication key/image includes user-generated content (e.g., a matrix object), user application-generated content (e.g., a digital imprint signature), and service provider-generated content (e.g., boundary indicators, datestamp, timestamp, service provider identifier, geo-location identifier, background image, etc.).

Each time access to a user account is requested, various portions of the authentication key/image change, thereby reducing the likelihood that the key/image is ascertained by an unauthorized user and used to compromise the user account. In particular, each time access is requested, the service provider system sends a different code to the user application, which results in a different digital imprint signature upon execution of the algorithm logic on the code. In addition, each time access is requested, a different background image is sent to the user application. As such, the technical features of the authentication mechanism described herein improve the functioning of a computer by mitigating the risk that a user account is compromised by the sending of authentication credentials over a network. In particular, an unauthorized entity may utilize snippet code or the like to listen to network traffic and determine patterns in the signal. The unauthorized entity may utilize these determined patterns (which may represent authentication credentials) to gain unauthorized access to a user account. The technical features of the authentication mechanism described herein mitigate this risk, by sending an authentication image containing a different sequence of bits each time access to a user account is requested, and thus, improves the functioning the computer with respect to authenticating access to a user account.

The authentication mechanism described herein also provides the technical effect of reducing the likelihood that a user account is compromised by providing a single key/image (e.g., the authentication key/image) that is used to identify both the user and the service provider. This single identity key/image is used in place of a user id and password combination, thereby eliminating the requirement that a user retain and remember his/her user id/password combination, and as a result, reducing the likelihood that authentication credentials are compromised. It should be appreciated that the above examples of technical features, technical effects, and improvements to the functioning of a computer and computer technology provided by example embodiments of the disclosure are merely illustrative and not exhaustive.

Illustrative Embodiments

Figure 1B:
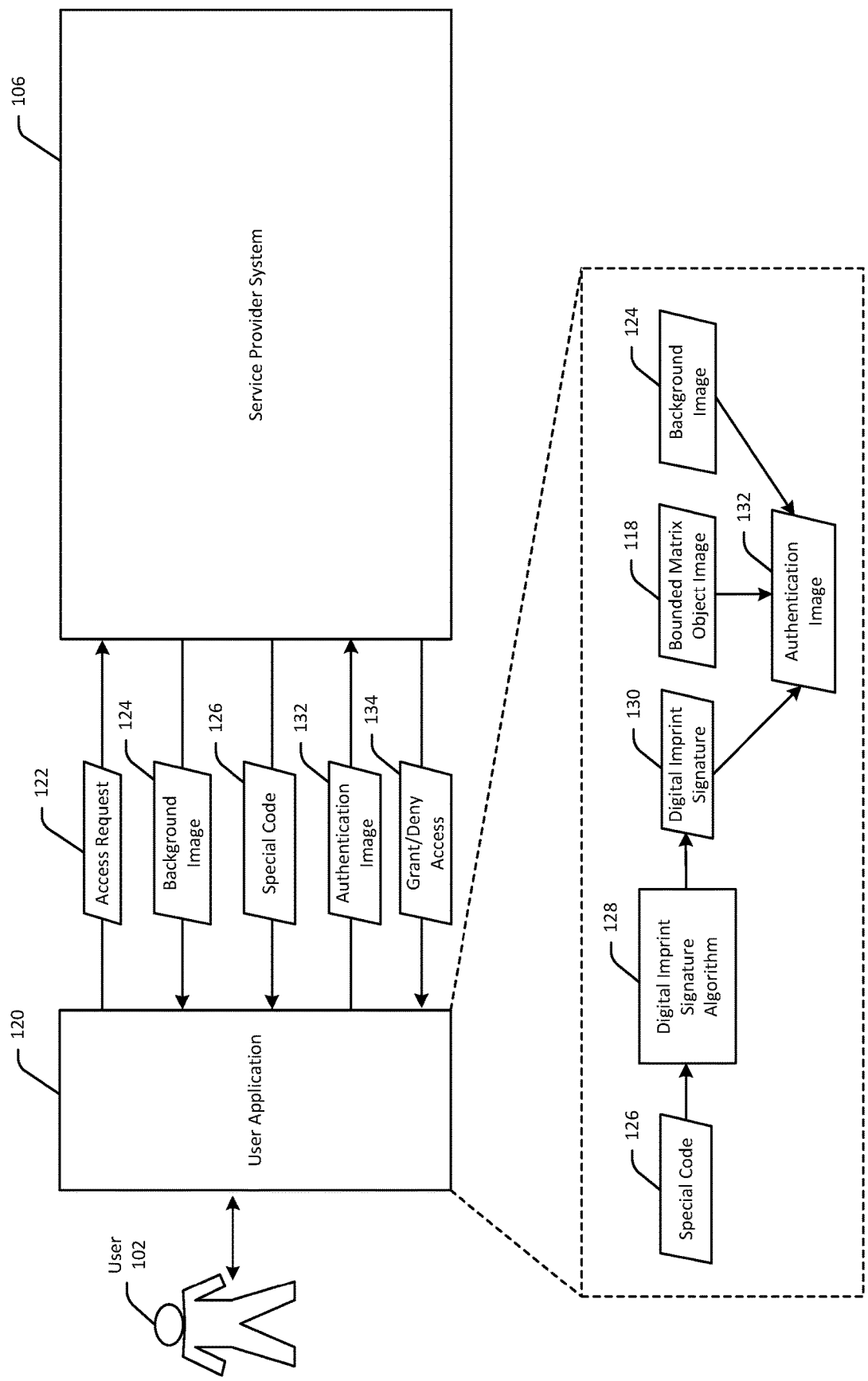
Figure 6:
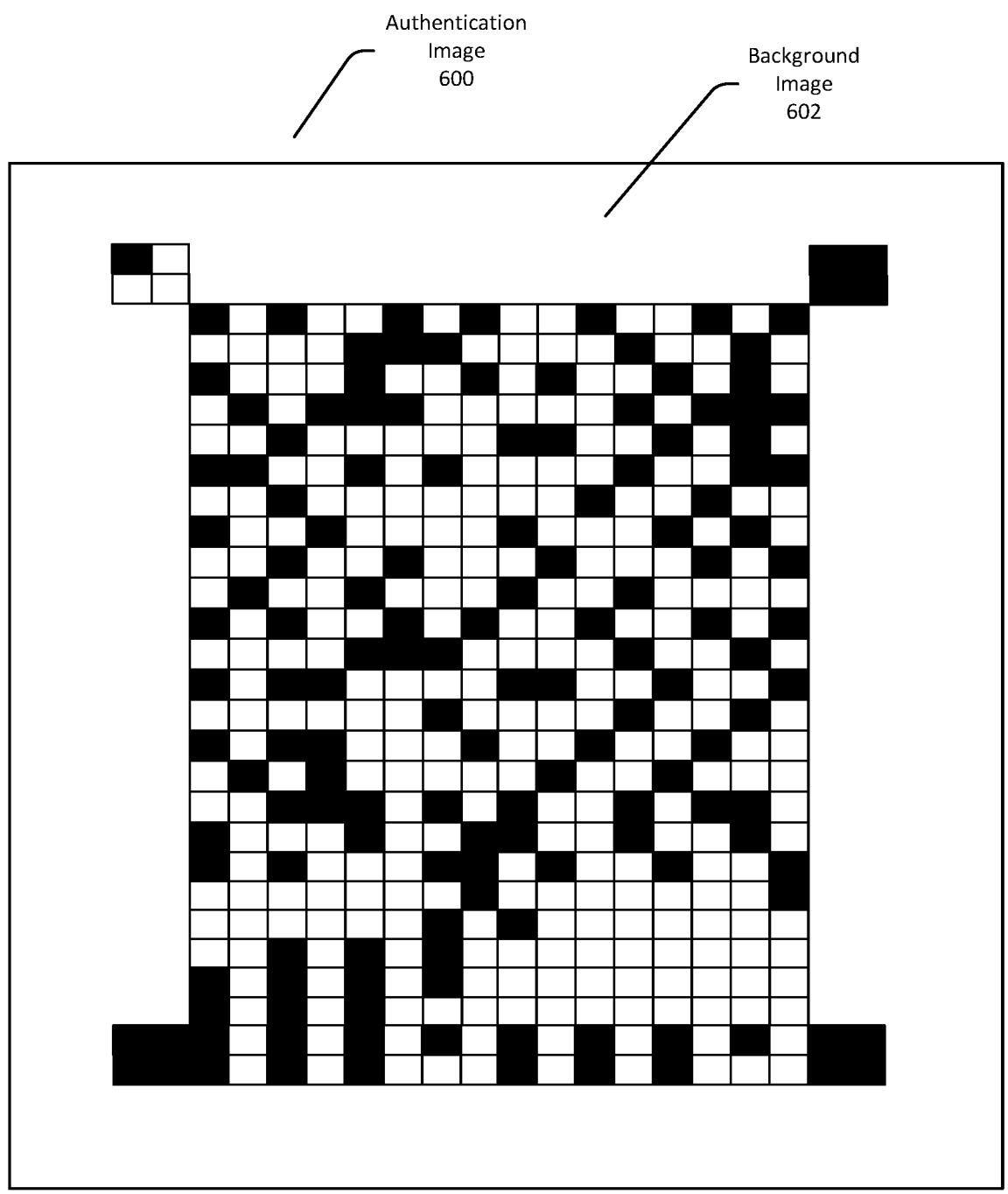
FIG. 6 depicts an authentication image in accordance with one or more example embodiments of the disclosure.
Figure 7:
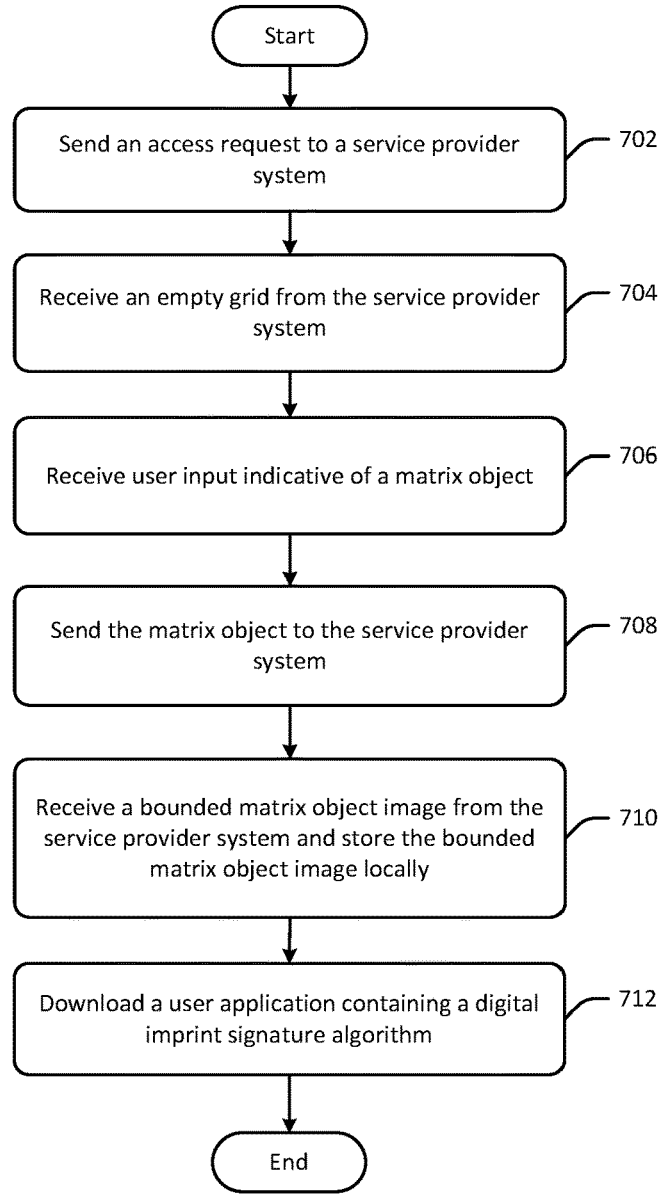
FIG. 7 is a process flow diagram of an illustrative method for obtaining and storing a bounded matrix object image locally on a user device and downloading a user application to the user device that contains a digital imprint signature algorithm in accordance with one or more example embodiments of the disclosure.
Figure 8:
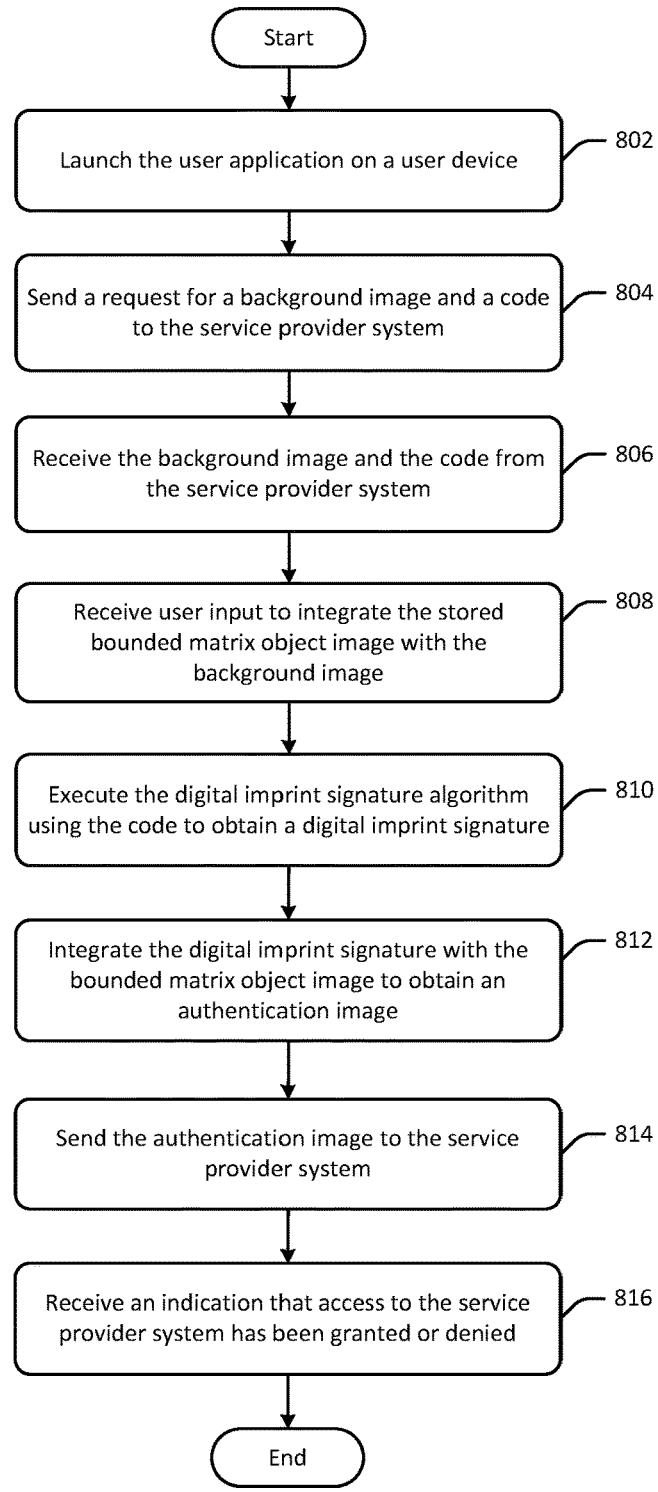
FIG. 8 is a process flow diagram of an illustrative method for generating an authentication image and sending the authentication image to a service provider system for authenticating access to the service provider system in accordance with one or more example embodiments of the disclosure.
Figure 9:
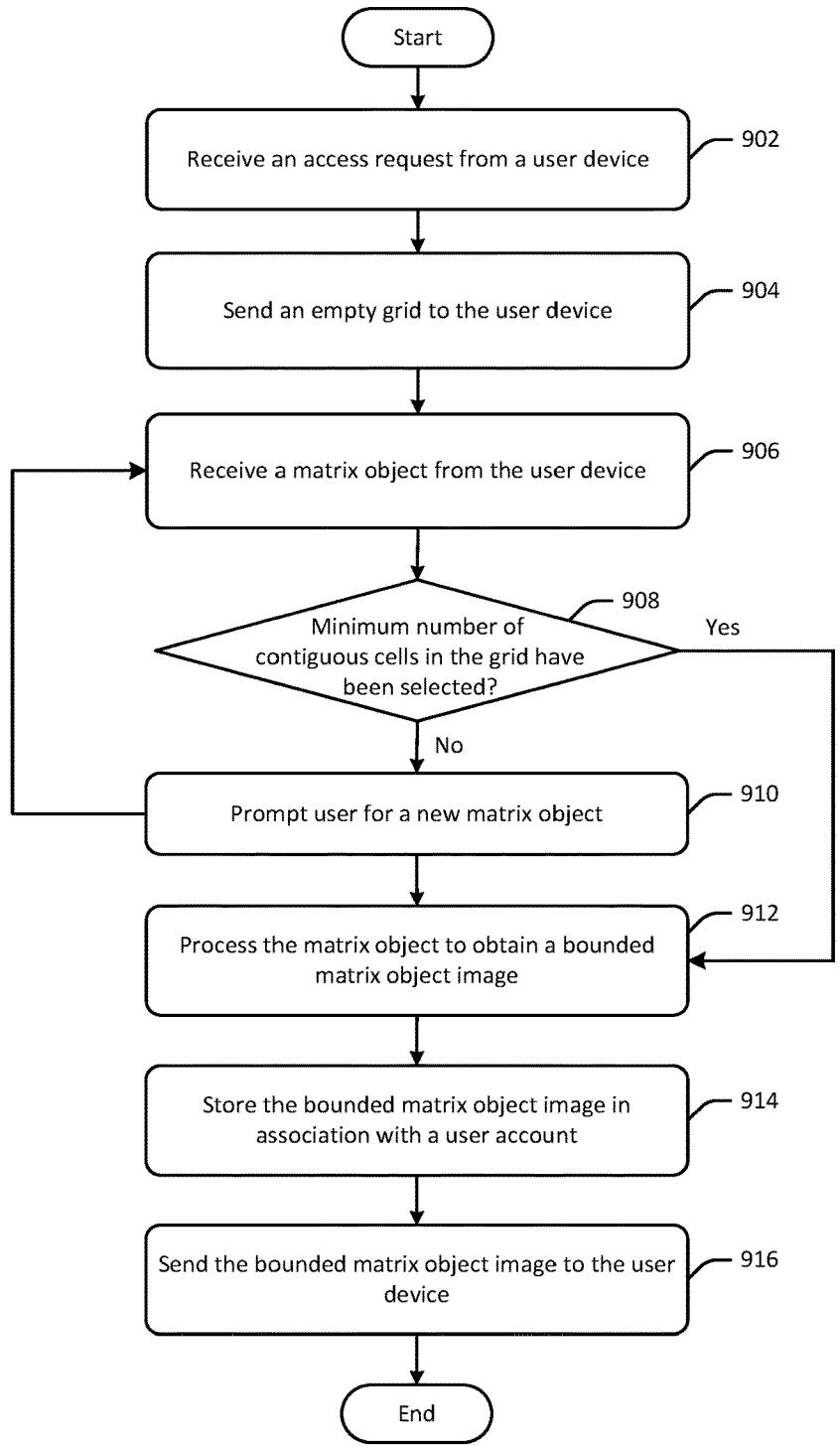
FIG. 9 is a process flow diagram of an illustrative method for generating a bounded matrix object image in accordance with one or more example embodiments of the disclosure.
Figure 10:
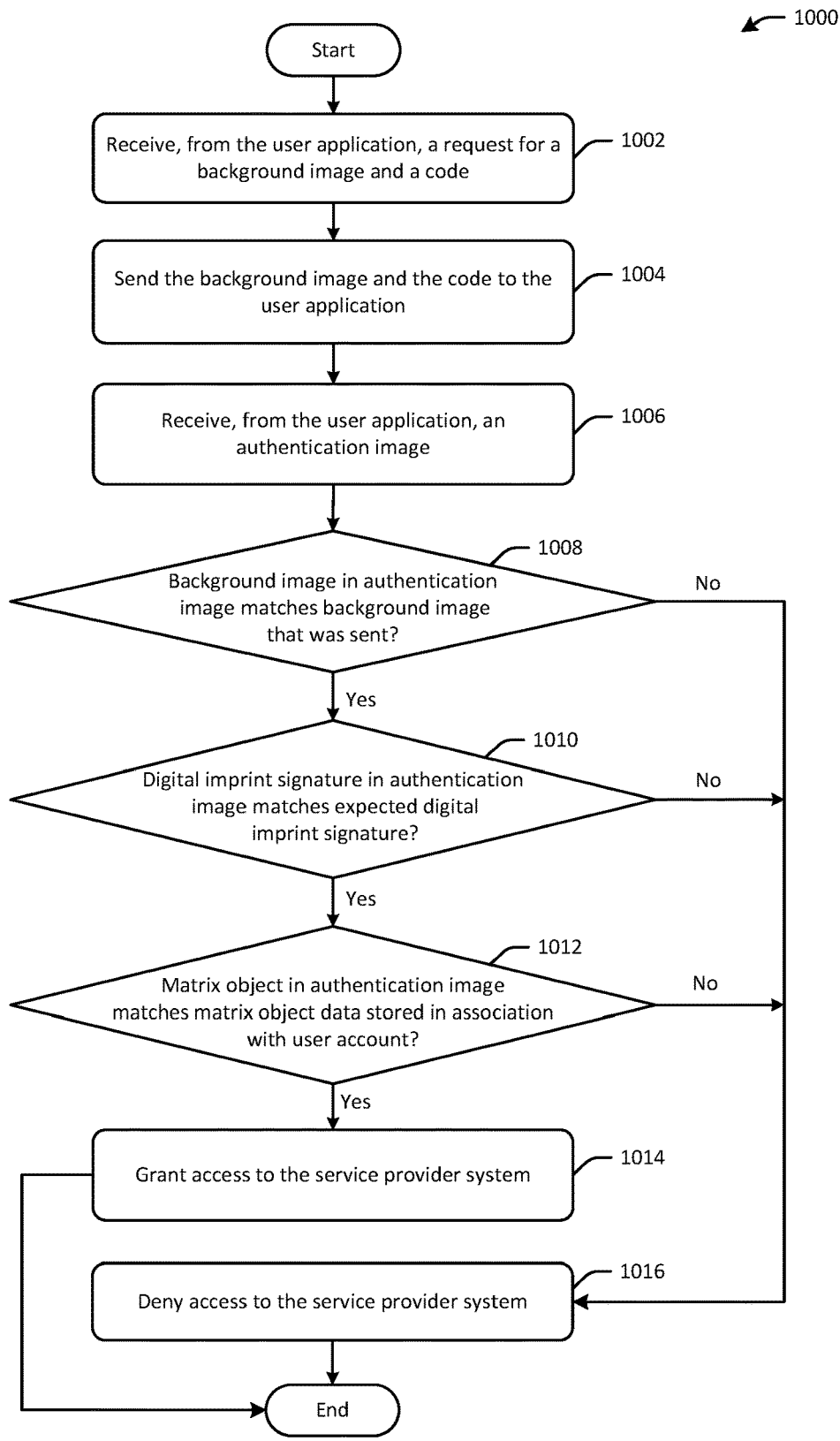
FIG. 10 is a process flow diagram of an illustrative method for authenticating access to a user account based at least in part on an authentication image in accordance with one or more example embodiments of the disclosure.

FIGS. 1A-1B are block diagrams that schematically depict a single key authentication mechanism in accordance with one or more example embodiments of the disclosure. FIG. 7 is a process flow diagram of an illustrative method 700 for obtaining and storing a bounded matrix object image locally on a user device and downloading a user application to the user device that contains a digital imprint signature algorithm. FIG. 8 is a process flow diagram of an illustrative method 800 for generating an authentication image and sending the authentication image to a service provider system for authenticating access to the service provider system. FIG. 9 is a process flow diagram of an illustrative method 900 for generating a bounded matrix object image. FIG. 10 is a process flow diagram of an illustrative method 1000 for authenticating access to a user account based at least in part on an authentication image. Initially, FIG. 1A will be described hereinafter in reference to FIGS. 7 and 9 to explain an initial account setup stage of the authentication mechanism described herein. Thereafter, FIG. 1B will be described in reference to FIGS. 8 and 10 to explain an authentication stage of the authentication mechanism described herein. FIGS. 2-6 will be referenced as appropriate during the discussion of FIGS. 1A-1B and 7-10.

Each operation of any of the methods 700-1000 may be performed by one or more components that may be implemented in any combination of hardware, software, and/or firmware. In certain example embodiments, one or more of these component(s) may be implemented, at least in part, as software and/or firmware that contains or is a collection of one or more program modules that include computer-executable instructions that when executed by a processing circuit cause one or more operations to be performed. A system or device described herein as being configured to implement example embodiments of the disclosure may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring now to FIGS. 7 and 9 in conjunction with FIG. 1A, at block 702 of the method 700, a user device 104 may send an access request 108 to a service provider system 106. The access request 108 may be received by the service provider system 106 at block 902 of method 900. The user device 104 may be operable by a user 102 and may be any suitable device including, but not limited to, a smartphone, a tablet, a personal computer, a personal digital assistant, an electronic reader, or the like. In certain example embodiments, the user 102 may utilize the user device 104 to access a portal or website on the service provider system 106 via which access to a user account can be requested and granted if the user 102 is authenticated with respect to the user account.

At block 904 of the method 900, the service provider system 106 may send an empty grid 110 of cells to the user device 104, which may be received by the user device 104 at block 704 of the method 700. More specifically, the service provider system 106 may provide access to an empty grid 110 containing selectable cells, and the user 102 may access the empty grid via a user interface of the user device 104.

Figure 2:
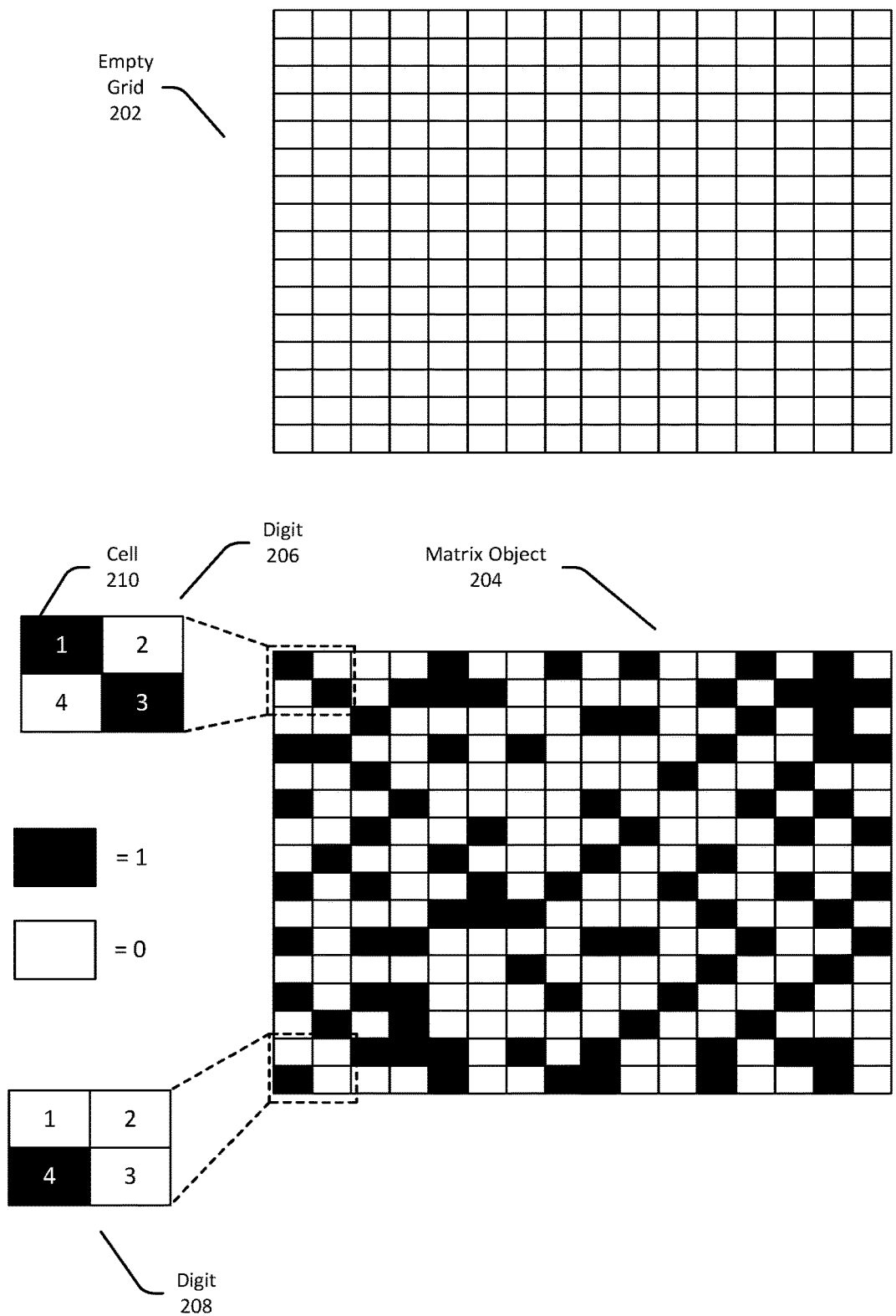
FIG. 2 depicts an empty grid and a user-generated matrix object that is formed using the empty grid in accordance with one or more example embodiments of the disclosure.

FIG. 2 depicts an example empty grid 202. The grid 202 includes a plurality of cells. While the grid 202 is illustratively shown as a 16×16 grid containing 256 cells, it should be appreciated that the grid 202 may be any size (e.g., 24×24, 32×32, etc.). In certain example embodiments, a grouping of one or more cells may represent a digit. For example, in the case of the grid 202 containing 256 cells, each 4-cell grouping may represent a digit such that the grid 202 is capable of storing 64 digits. In certain example embodiments, each cell may represent a binary value (e.g., a 0 or 1), such that each digit (e.g., each 4-cell grouping) may represent a value between 0 and 15. It should be appreciated that the number of cells used to form a digit and the value that each cell may contain is not restricted to the examples described above.

At block 706 of the method 700, the user device 104 may receive input from the user 102 that is indicative of a matrix object 112. FIG. 2 depicts an example matrix object 204 generated based on input from the user 102. In particular, the user 102 may be provided with the capability to select any of the cells in the grid 202 to create a sequence of selected and unselected cells that is representative of a sequence of bits. Alternatively, the user 102 may be provided with the capability to mark each cell with some type of indicia (or leave a cell unmarked) to represent a value associated with the cell.

Referring to the example matrix object 204, a 4-cell grouping representing a digit 206 is illustratively shown as occupying the top left corner of the matrix object 204. The cells of the each digit in the matrix object 204 may be assigned respective bit positions. For example, a cell 210 of digit 206 may be assigned bit position 1. Bit positions 2, 3, and 4 may be assigned to the other cells in the digit 206 while moving clockwise through the cells of the digit 206. In the example matrix object 204 depicted in FIG. 2, a solid, filled-in cell is used to designate a selected cell having a binary value of 1 and a white cell is used to designate an unselected cell having a binary value of 0. It should be appreciated that these designations are merely illustrative and not exhaustive. Any suitable indicia may be used to differentiate a cell having a value of 1 from a cell having a value of 0, or more broadly, to differentiate a cell having a particular value from a cell having a different value. Using this example designation scheme, the digit 206 includes a sequence of selected and unselected cells representing the binary value 0101 (or the decimal value 5), whereas a digit 208 includes a sequence of selected and unselected cells representing the binary value 1000 (or the decimal value 8). Similarly, each additional grouping of cells constituting a digit may be representative of a particular sequence of bits, and thus, a particular value.

In certain example embodiments, the matrix object 204 may be read by the service provider system 106 starting with the digit 206. In other example embodiments, reading of the matrix object 204 may begin at any other location of the matrix object 204 (e.g., with the digit 208 in the bottom left corner). Further, it should be appreciated that a grid of any size may be used and that any number of cells may be designated as constituting a digit. For example, in certain example embodiments, an 8-cell grouping of cells may constitute a digit, in which case, each digit may represent a base-8 value.

After the matrix object 112 (e.g., the example matrix object 204) is generated, the matrix object 112 may be sent from the user device 104 to the service provider system 106 at block 708 of the method 700. The matrix object 112 may be received by the service provider system 106 at block 906 of the method 900. Upon receiving the matrix object 112, the service provider system 106 may perform various validation checks. For example, at block 908 of the method 900, the service provider system 106 may perform a validation check to ensure that a minimum number of contiguous cells have been selected in the matrix object 112. This validation check may be performed to ensure that the matrix object 112 is complex enough to mitigate the risk that an unauthorized user deciphers the sequence of bits represented by the matrix object 112. In response to a negative determination at block 908, the service provider system 106 may prompt the user 102 to make a new selection of cells corresponding to a new matrix object at block 910 of the method 00.

On the other hand, in response to a positive determination at block 908, the method 900 may proceed to block 912, where computer-executable instructions of one or more bounded matrix object image generation modules may be executed to process the matrix object 112 to obtain a bounded matrix object image 118. In particular, computer-executable instructions of the bounded matrix object image generation module(s) may be executed to add, combine, or otherwise integrate additional data with the matrix object 112.

Figure 3:
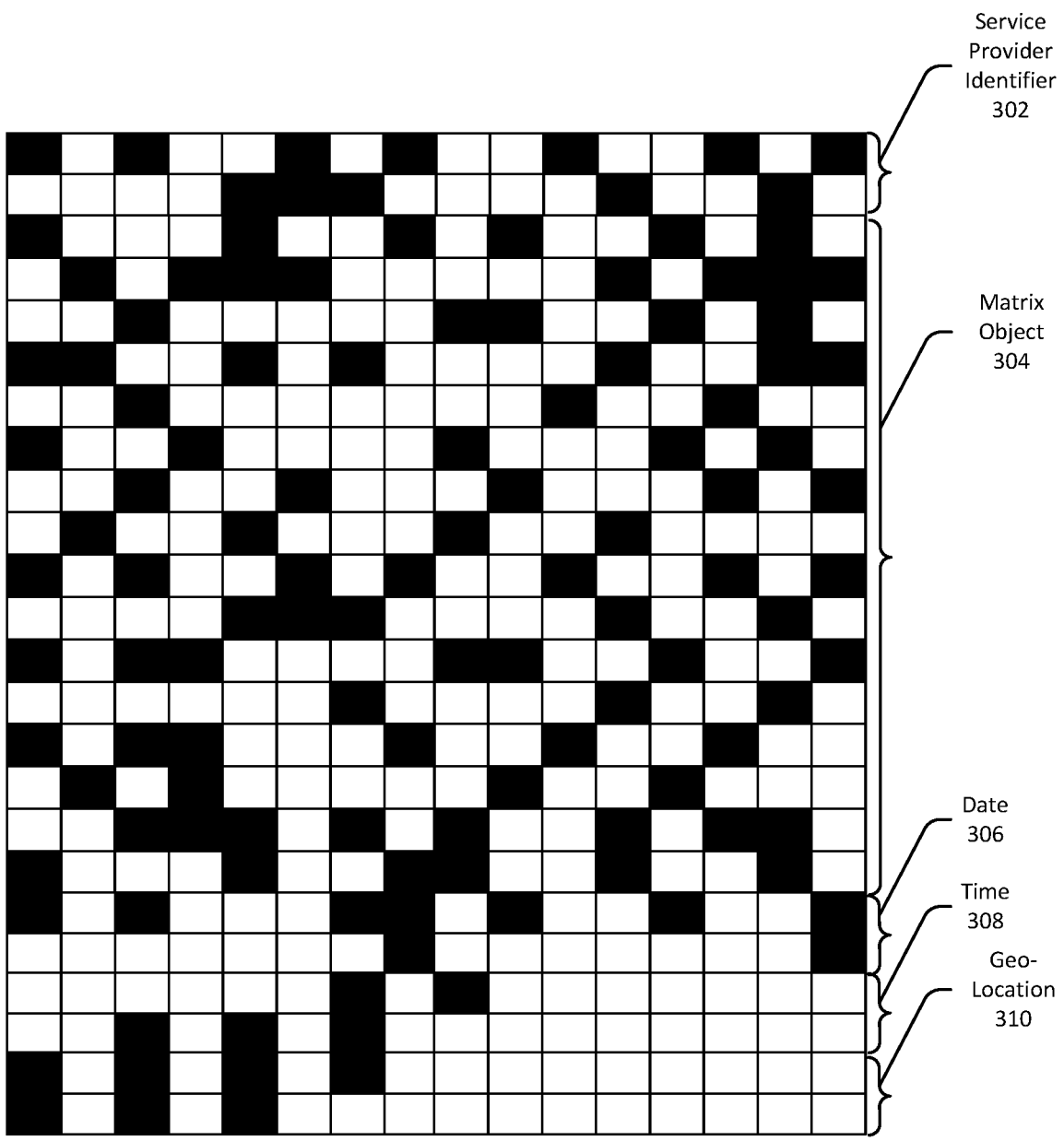
FIG. 3 depicts a matrix object containing additional data generated by a service provider system in accordance with one or more example embodiments of the disclosure.
Figure 4:
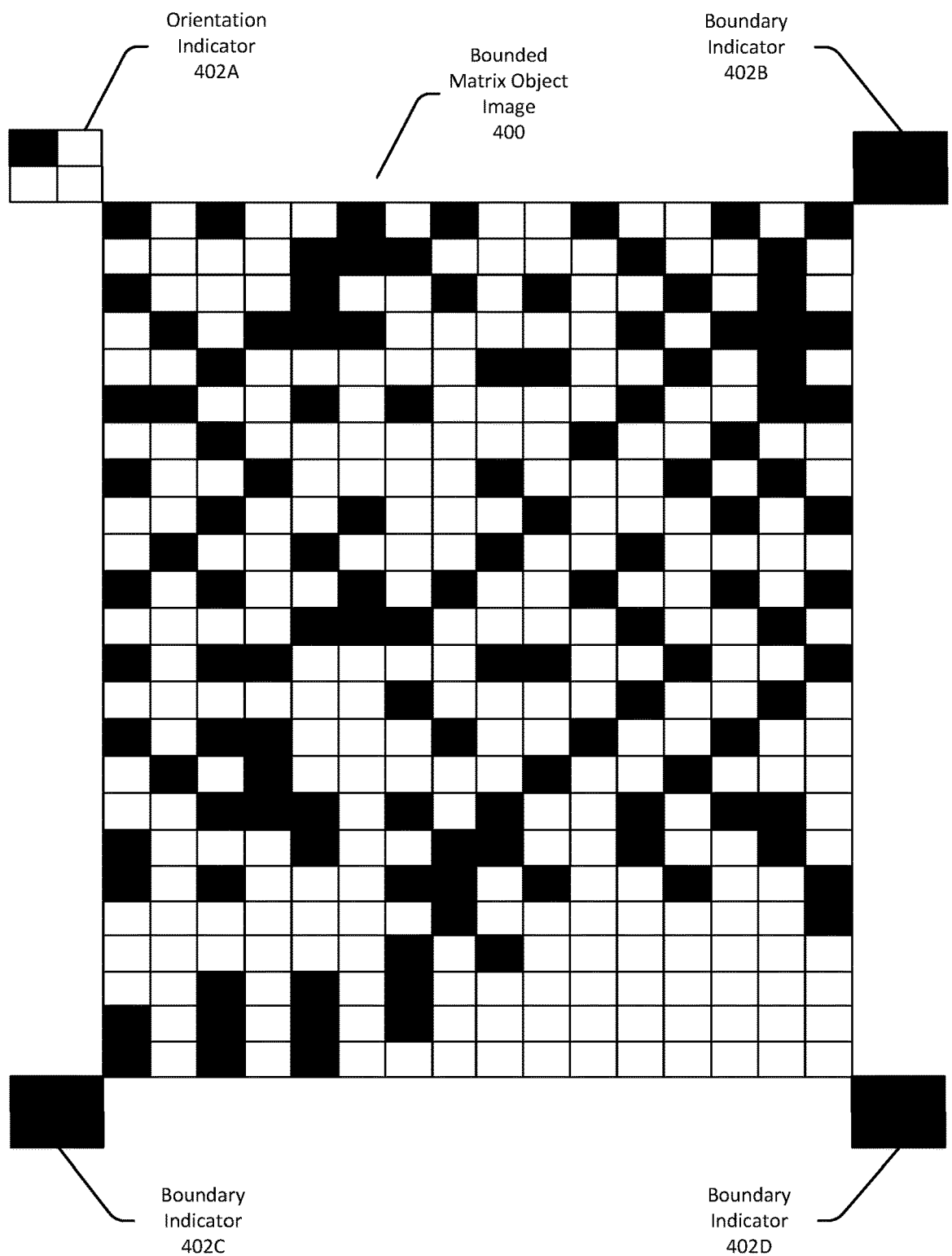
FIG. 4 depicts a bounded matrix object image in accordance with one or more example embodiments of the disclosure.

Referring now to FIGS. 3 and 4, an example matrix object 304 is depicted. The matrix object 304 is illustratively shown as including the same selection of cells as the matrix object 204, and thus, represents the same sequence of bits. The additional data added to the matrix object 304 may include, among other things, a service provider identifier 302, a datestamp 306, a timestamp 308, and a geo-location identifier. Each of these identifiers may be represented as a sequence of digits, where each digit includes a grouping of cells (e.g., a 4-cell grouping) representing a particular sequence of bits. While these identifiers are illustratively depicted in FIG. 3 as including 8 digits (where each digit contains 4 cells), it should be appreciated that any identifier may include a greater or lesser number of digits, and each digit may include a greater or lesser number of cells.

The date identifier 306, for example, may include 8 digits that correspond to the MM-DD-YYYY format. Thus, the example date identifier 306 depicted in FIG. 3 represents the date 11-07-2016. As another example, the time identifier 308 may include 8 digits, where 6 of the digits correspond to the format HH-MM-SS, and the remaining two digits are used to designate AM or PM. Thus, the example time identifier 308 depicted in FIG. 3 represents the time 04:45:10 AM. In certain example embodiments, multiple digits of an identifier may be concatenated to provide a higher-base numeric representation. For example, the geo-location identifier 310 may include 4 digits, where each digit is a concatenation of two 4-cell groupings, and in this manner, may be used to provide hexadecimal representation. This allows for the geo-location identifier 310 to accommodate more complex characters if needed.

In addition to the various types of identifiers described earlier, the service provider system 106 may also add, combine, or otherwise integrate a plurality of boundary indicators with the matrix object 112. For example, as shown in FIG. 4, computer-executable instructions of the bounded matrix object image generation module(s) may be executed to cause boundary indicators 402A-404D to be added to the grid adjacent to the corners of the matrix object 304 having the identifiers 302, 306, 308, and 310 added thereto. The combination of the matrix object 304 (which optionally is combined with the various identifiers 302 and 306-310) and the boundary indicators 402A-402D may be referred to herein as a bounded matrix object image 400.

Each of the boundary indicators 402B-402D may include a combination of cells representing a predetermined same value. In the example shown in FIG. 4, each boundary indicator (other than boundary indicator 402A) is shown as representing the binary value 1111 (decimal value 15). In certain example embodiments, the boundary indicators 402A-402D may be located by determining that each boundary indicator 402A-402D is surrounded on all sides by only cells that have a particular same value (e.g., only white cells which illustratively represent the binary value 0). Once each boundary indicator is located, the outer bounds of the data (e.g., the matrix object 304 and associated identifiers) to be read/processed as part of an authentication process can be ascertained. The boundary indicators 402A-402D may also serve to designate the boundaries of the matrix object data when the matrix object 304 (including any additional identifiers added by the service provider system 106) resides within a background image, as will be described in more detail later in this disclosure.

In certain example embodiments, one of the boundary indicators (e.g., boundary indicator 402A) may also serve as an orientation indicator. In particular, the orientation indicator 402A may include cells representing a different sequence of bits (and thus a different value) than the other boundary indicators 402B-402D. In this manner, the location from which the data reading/processing is to begin can be determined.

Processing the matrix object 112 at block 912 of the method 900 may further include reading matrix object data 114 from the matrix object 112. For example, the service provider system 106 may read the data of the matrix object 304 to determine that sequence of bits represented by the matrix object 304. At block 914, the service provider system 106 may store the matrix object data 114 in one or more datastores 116. More specifically, the service provider system 106 may store the bounded matrix object image 400, or more particularly the data encoded therein, in association with a particular user account. In storing the bounded matrix object image 400, the data encoded by the matrix object 304 may be stored separately (or otherwise differentiated via a tag or label) from the service provider-generated data. Further, the different portions of the service provider-generated data (e.g., the service provider identifier 302, the datestamp 306, the timestamp 308, the geo-location identifier 310, the boundary indicators 402A-402D, etc.) may be similarly stored separately or otherwise distinguished from one another.

At block 916 of the method 900, the service provider system 106 may send a bounded matrix object image 118 to the user device 104. The bounded matrix object image 118 may be the example bounded matrix object image 400. At block 710 of the method 700, the user device 104 may receive the bounded matrix object image 118 and store it in local storage of the user device 104 such that it can be used later for authentication purposes.

In addition, at block 712 of the method 700, the user device 104 may download a user application 120 containing a digital signature imprint algorithm. In particular, the bounded matrix object image 118 may be generated during initial user account setup. The user application 120 may need to be downloaded to the user device 104 during this initial user account setup in order to facilitate subsequent authentications of the user 102 with respect to the user account using an authentication image generated from the bounded matrix object image 118.

The user application 120 may be downloaded from a portal or website of the service provider system 106. At the time of download, the user 102 may be provided with the capability to select an algorithm logic that can be used to generate a digital imprint signature. Alternatively, a default algorithm logic may be used. The selected algorithm may be embedded into the code of the user application 120 and downloaded to the user device 104 for subsequent authentication. Each instance of the user application 120 that is downloaded from the service provider system 106 may be labeled with a unique identifier for tracking purposes as well as to associate the selected algorithm with the user application instance 120 that is downloaded and the corresponding user account.

The initial user account setup phase of the authentication mechanism described herein has been described above. The authentication phase of the authentication mechanism described herein will be described in more detail in reference to FIGS. 1B, 8, and 10. At block 802 of the method 800, the user 102 may launch the user application 120 on the user device 104. The user application 120 code may be launched on the user device 104 to initiate access to the service provider system 106.

Upon launch, the user application 120 may send a request 122 to the service provider system 106 for a background image 124 and a code 126. The code 126 may be a sequence of numbers and/or characters. The background image 124 may be any suitable image with which the bounded matrix object image 118 can be combined or otherwise integrated. At block 1002 of the method 1000, the service provider system 106 may receive the request 122 from the user application 120. At block 1004 of the method 1000, computer-executable instructions of one or more authentication modules residing on the service provider system 106 may be executed to send the background image 124 and the code 126 to the user application 120.

Upon receipt of the background image 124 and the code 126 from the service provider system 106 at block 806 of the method 800, the user application 120 may receive input from the user 102 at block 808 to combine or otherwise integrate the bounded matrix object image 118 with the background image 124. More specifically, in response to user input, the bounded matrix object image 118 may be retrieved from local storage on the user device 104 and combined or otherwise integrated with the background image 124 at block 808. For example, in certain example embodiments, the bounded matrix object image 118 may be overlaid on the background image 124 via a drag-and-drop user operation.

In addition, at block 810, a digital imprint signature algorithm 128 previously downloaded to the user device 104 along with the user application 120 may be executed to generate a digital imprint signature 130. More specifically, the digital imprint signature algorithm 128 may receive the code 126 as input and output the digital imprint signature 130. Then, at block 812, computer-executable instructions of one or more authentication image generation modules forming part of the user application 120 may be executed to add, combine, or otherwise integrate the digital imprint signature 130 with the bounded matrix object image 118. In certain example embodiments, the digital imprint signature 130 may be represented by a particular sequence of selected and unselected cells that corresponds to a particular sequence of binary values and that is added to the bounded matrix object image 118 that is overlaid on the background image 124.

Figure 5:
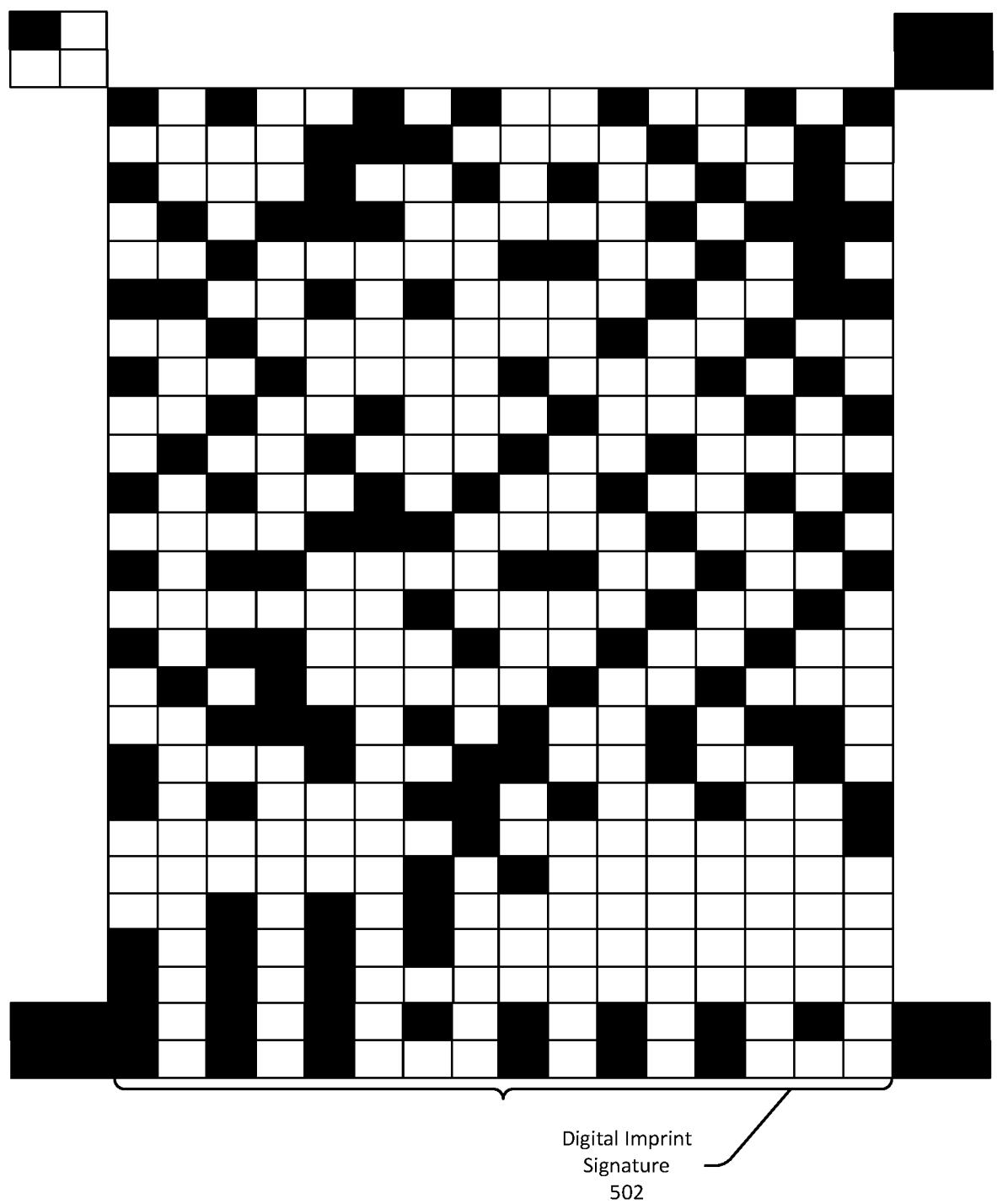
FIG. 5 depicts a bounded matrix object image integrated with a digital imprint signature in accordance with one or more example embodiments of the disclosure.

An example digital imprint signature 502 is shown in FIG. 5. The example digital imprint signature 502 includes 8 digits, where each digit includes a grouping of 4-cells, and where each cell represents a binary value of 0 or 1. The digital imprint signature 502 is illustratively shown in FIG. 5 as being added to the bounded matrix object image 400 beneath the matrix object 304 and between the boundary indicators 402C and 402D. However, it should be appreciated that the digital imprint signature 130 may include any number of cells and may be integrated with the bounded matrix object image 118 in any suitable manner. For instance, the example digital imprint signature 502 may instead be integrated with the bounded matrix object image 400 between boundary indicators 402A and 402 D; between boundary indicators 402A and 402B; or between boundary indicators 402B and 402C.

The combination of the bounded matrix object image 118, the digital imprint signature 130, and the background image 124 may form an authentication image 132. The authentication image 132 may serve as a key for authenticating access by the user 102 to a user account maintained on the service provider system 106. An example authentication image 602 is depicted in FIG. 6. The authentication image 602 includes the bounded matrix object image 400 (the matrix object 304 with the various identifiers 302, 306-310 and the boundary indicators 402A-402D added thereto), the digital imprint signature 502 that is added to the bounded matrix object image 400, and a background image 602 over which the bounded matrix object image 400 and the digital imprint signature 502 are overlaid.

At block 814 of the method 800, the user application 120 may send the authentication image 132 to the service provider system 106. In certain example embodiments, the user 102 may be provided with the capability to perform a drag-and-drop operation to drag and drop the authentication image 132 onto a service provider portal sign-in area (e.g., a virtual "key-hole") in order to initiate the authentication process. The authentication image 132 may be received by the service provider system 106 at block 1006 of the method 1000. Upon receipt of the authentication image 132, the service provider system 106 may determine, based at least in part on the authentication image 132, whether access to a user account should be granted or denied.

In particular, the service provider system 106 may determine whether the authentication image 132 satisfies various requirements for authentication. More specifically, computer-executable instructions of the authentication module(s) may be executed at blocks 1008-1012 of the method 1000 to determine whether various authentication requirements are satisfied by the authentication image 132. In particular, computer-executable instructions of the authentication module(s) may be executed at block 1008 to determine whether the background image in the authentication image 132 matches the background image 124 that was previously sent to the user application 120.

To process the background image contained in the authentication image 132, the authentication module(s) may compare one or more corner portions of the background image contained in the authentication image 132 to corresponding corner portions of the saved background image 124 that was previously sent to the user application 120 during the same session. The corner portions that are evaluated may have a predetermined size and shape, as determined by the service provider system 106. If a match is detected (e.g., a positive determination at block 1008), the authentication module(s) may recognize the background image contained in the authentication image as a valid image for the current authentication session.

In response to a positive determination at block 1008, the method 1000 may proceed to block 1010, where computer-executable instructions of the authentication module(s) may be executed to determine whether the digital imprint signature 130 contained in the authentication image 132 matches an expected digital imprint signature. In particular, the service provider system 106 may identify the digital imprint signature algorithm 128 that is stored in association with the user account to which access is being sought and execute the algorithm 128 using the code 126 that was previously provided to the user application 120 to obtain an expected digital imprint signature. The authentication module(s) may then be executed to compare the expected digital imprint signature to the digital imprint signature 130 that is included in the authentication image 132.

In response to a positive determination at block 1010, the method 1000 may proceed to block 1012, where computer-executable instructions of the authentication module(s) may be executed to determine whether matrix object data in the authentication image 132 matches matrix object data 114 stored in association with the user account. More specifically, referring to the example bounded matrix object image 400, the authentication module(s) may utilize the boundary indicators 402A-402D to ascertain the boundaries of the matrix object 304 (along with any associated identifiers), and may further utilize the orientation indicator 402A to determine where to being reading the matrix object data. The authentication module(s) may then read the matrix object data from the authentication image 132 and compare the read matrix object data to matrix object data 114 stored in association with user account.

In certain example embodiments, the authentication module(s) may read the service provider identifier 302, the date 306, the time 308, and/or the geo-location identifier 310 from the matrix object data contained in the authentication image 132 and compare these identifiers to corresponding identifiers stored in association with the user account. The authentication module(s) may also read the data encoded in the matrix object 304 itself and compare this read data to matrix object data 114 stored in association with the user account. In certain example embodiments, an exact match for each of these components of the matrix object data may be required. In other example embodiments, one or more of these components of the matrix object data may be permitted to deviate from corresponding stored data within a predetermined tolerance.

In response to positive determinations at blocks 1008, 1010, and 1012, access to the service provider system 106 (or more specifically a user account maintained on the service provider system 106) may be granted. The user device 104 may receive, from the service provider system 106, an indication 134 of the grant of access at block 816 of the method 800. On the other hand, if any of the determinations at blocks 1008, 1010, or 1012 is negative, the method 1000 may proceed to block 1016 and access to the service provider system 106 (or more specifically a user account maintained on the service provider system 106) may be denied. An indication 134 of the denial of access may be received from the service provider system 106 by the user device 104 at block 816 of the method 800.

It should be appreciated that the authentication requirements described above are merely illustrative and not exhaustive. In certain example embodiments, the authentication module(s) may be configured to determine whether different or additional authentication requirements are met by the authentication image 132 that is received from the user device 104.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 11:
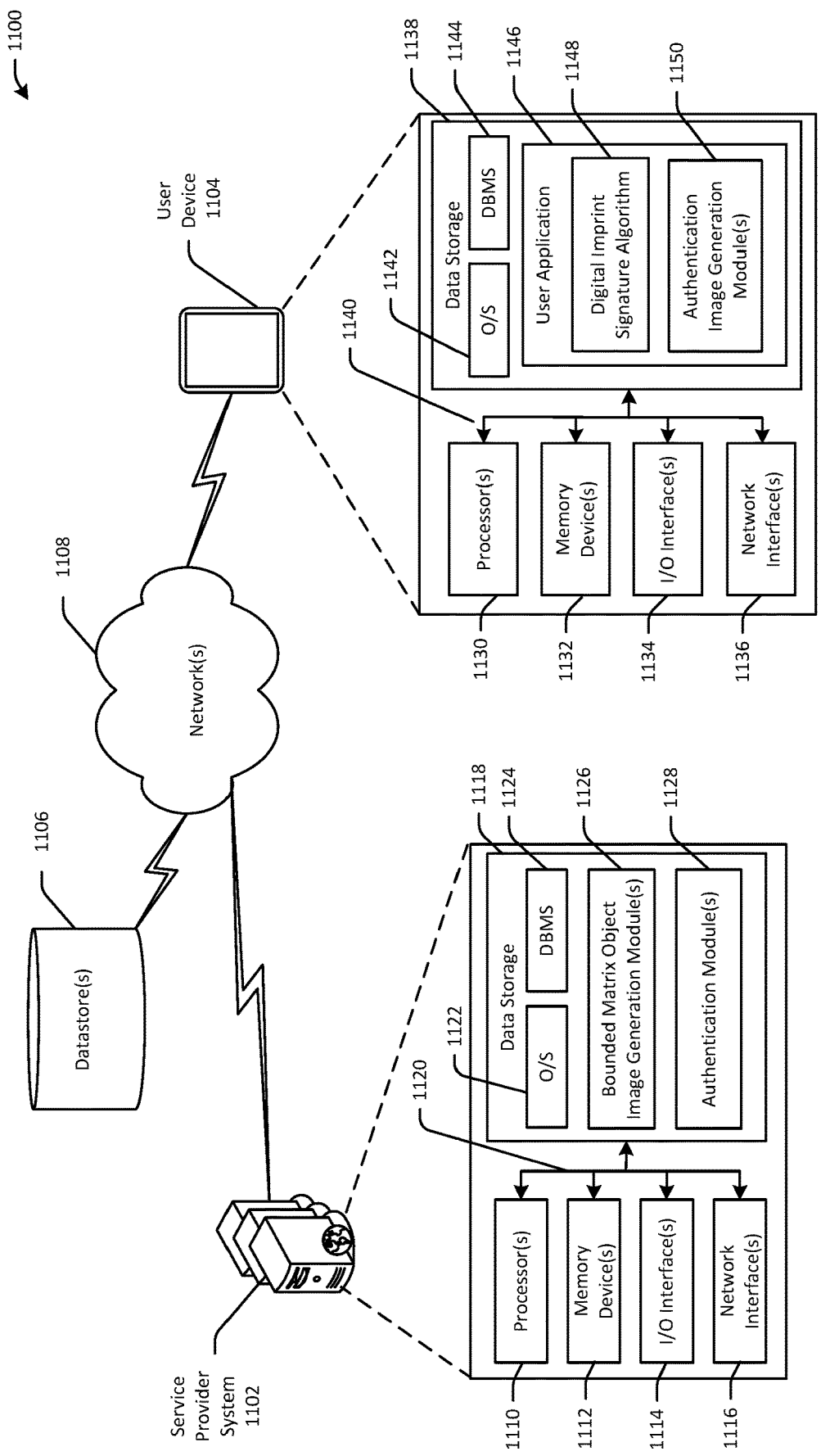
FIG. 11 is a schematic diagram of an illustrative networked architecture in accordance with one or more example embodiments of the disclosure.

FIG. 11 is a schematic diagram of an illustrative networked architecture 1100 configured to implement one or more example embodiments of the disclosure. The illustrative architecture 1100 may include a service provider system 1102 (which may represent an example configuration of the service provider system 106) and a user device 1104 (which may represent an example configuration of the user device 104). The service provider system 1102 and the user device 1104 may be configured to communicate over one or more networks 1108. The service provider system 1102 may include one or more servers and functionality described in connection with the service provider system 1102 may be distributed across multiple servers.

In an illustrative configuration, the service provider system 1102 may include one or more servers which, in turn, may include one or more processors (processor(s)) 1102, one or more memory devices 1112 (generically referred to herein as memory 1112), one or more input/output ("I/O") interface(s) 1114, one or more network interfaces 1116, and data storage 1118. The service provider system 1102 may further include one or more buses 1120 that functionally couple various components of the service provider system 1102.

The bus(es) 1120 may include at least one of a system bus, a memory bus, an address bus, or a message bus, and may permit the exchange of information (e.g., data (including computer-executable code), signaling, etc.) between various components of the service provider system 1102. The bus(es) 1120 may include, without limitation, a memory bus or a memory controller, a peripheral bus, an accelerated graphics port, and so forth. The bus(es) 1120 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1112 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1112 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1112 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1118 may include removable storage and/or non-removable storage including, but not limited to, magnetic storage, optical disk storage, and/or tape storage. The data storage 1118 may provide non-volatile storage of computer-executable instructions and other data. The memory 1112 and the data storage 1118, removable and/or non-removable, are examples of computer-readable storage media (CRSM) as that term is used herein.

The data storage 1118 may store computer-executable code, instructions, or the like that may be loadable into the memory 1112 and executable by the processor(s) 1110 to cause the processor(s) 1110 to perform or initiate various operations. The data storage 1118 may additionally store data that may be copied to memory 1112 for use by the processor(s) 1110 during the execution of the computer-executable instructions. Moreover, output data generated as a result of execution of the computer-executable instructions by the processor(s) 1110 may be stored initially in memory 1112 and may ultimately be copied to data storage 1118 for non-volatile storage.

More specifically, the data storage 1118 may store one or more operating systems (O/S) 1122; one or more database management systems (DBMS) 1124 configured to access the memory 1112 and/or one or more external data store(s) 1106; and one or more program modules, applications, engines, computer-executable code, scripts, or the like such as, for example, one or more bounded matrix object image generation modules 1126 and one or more authentication modules 1128. Any of the components depicted as being stored in data storage 1118 may include any combination of software, firmware, and/or hardware. The software and/or firmware may include computer-executable instructions (e.g., computer-executable program code) that may be loaded into the memory 1112 for execution by one or more of the processor(s) 1110 to perform any of the operations described earlier in connection with similarly named program modules.

Although not depicted in FIG. 11, the data storage 1118 may further store various types of data utilized by components of the service provider system 1102 (e.g., matrix object data, user account data, digital signature algorithm data, background images, etc.). Any data stored in the data storage 1118 may be loaded into the memory 1112 for use by the processor(s) 1110 in executing computer-executable instructions. In addition, any data stored in the data storage 1118 may potentially be stored in the external data store(s) 1106 and may be accessed via the DBMS 1124 and loaded in the memory 1112 for use by the processor(s) 1110 in executing computer-executable instructions.

The processor(s) 1110 may be configured to access the memory 1112 and execute computer-executable instructions loaded therein. For example, the processor(s) 1110 may be configured to execute computer-executable instructions of the various program modules, applications, engines, or the like of the service provider system 1102 to cause or facilitate various operations to be performed in accordance with one or more embodiments of the disclosure. The processor(s) 1110 may include any suitable processing unit capable of accepting data as input, processing the input data in accordance with stored computer-executable instructions, and generating output data. The processor(s) 1110 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1110 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1110 may be capable of supporting any of a variety of instruction sets.

Referring now to other illustrative components depicted as being stored in the data storage 1118, the O/S 1122 may be loaded from the data storage 1118 into the memory 1112 and may provide an interface between other application software executing on the service provider system 1102 and hardware resources of the service provider system 1102. More specifically, the O/S 1122 may include a set of computer-executable instructions for managing hardware resources of the service provider system 1102 and for providing common services to other application programs. In certain example embodiments, the O/S 1122 may include or otherwise control execution of one or more of the program modules depicted as being stored in the data storage 1118. The O/S 1122 may include any operating system now known or which may be developed in the future including, but not limited to, any server operating system, any mainframe operating system, or any other proprietary or non-proprietary operating system.

The DBMS 1124 may be loaded into the memory 1112 and may support functionality for accessing, retrieving, storing, and/or manipulating data stored in the memory 1112, data stored in the data storage 1118, and/or data stored in the external data store(s) 1106 (which may include any of the data store(s) 116). The DBMS 1124 may use any of a variety of database models (e.g., relational model, object model, etc.) and may support any of a variety of query languages. The DBMS 1124 may access data represented in one or more data schemas and stored in any suitable data repository. The external data store(s) 1106 that may be accessible by the service provider system 1102 via the DBMS 1124 may include, but not limited to, databases (e.g., relational, object-oriented, etc.), file systems, flat files, distributed datastores in which data is stored on more than one node of a computer network, peer-to-peer network datastores, or the like.

Referring now to other illustrative components of the service provider system 1102, the input/output (I/O) interface(s) 1114 may facilitate the receipt of input information by the service provider system 1102 from one or more I/O devices as well as the output of information from the service provider system 1102 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the service provider system 1102 or may be separate. The I/O devices may further include, for example, any number of peripheral devices such as data storage devices, printing devices, and so forth.

The I/O interface(s) 1114 may also include an interface for an external peripheral device connection such as universal serial bus (USB), FireWire, Thunderbolt, Ethernet port or other connection protocol that may connect to one or more networks. The I/O interface(s) 1114 may also include a connection to one or more antennas to connect to one or more of the network(s) 1106 via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The service provider system 1102 may further include one or more network interfaces 1116 via which the service provider system 1102 may communicate with any of a variety of other systems, platforms, networks, devices, and so forth. The network interface(s) 1116 may enable communication, for example, with the user device 1104 (and any number of additional user devices) via the network(s) 1108. The network(s) 1108 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 1108 may have any suitable communication range associated therewith and may include, for example, global networks (e.g., the Internet), metropolitan area networks (MANs), wide area networks (WANs), local area networks (LANs), or personal area networks (PANs). In addition, the network(s) 1108 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the user device 1104 may include one or more processors (processor(s)) 1130, one or more memory devices 1132 (generically referred to herein as memory 1132), one or more input/output ("I/O") interface(s) 1134, one or more network interfaces 1136, and data storage 1138. The user device 1104 may further include one or more buses 1140 that functionally couple various components of the user device 1104.

The processor(s) 1130, the memory 1132, the I/O interface(s) 1134, and the network interface(s) 1136 may include any of the types of components and functionality described earlier in reference to the processor(s) 1110, memory 1112, I/O interface(s) 1114, and network interface(s) 1116 of the service provider system 1102, respectively. The data storage 1138 may store one or more operating systems (O/S) 1142; one or more database management systems (DBMS) 1144 configured to access the memory 1132 and/or the external data store(s) 1106; and one or more program modules, applications, engines, computer-executable code, scripts, or the like such as, for example, a user application 1146 which may, in turn, contain a digital signature algorithm 1148 and one or more authentication image generation modules 1150. The O/S 1142 and the DBMS 1144 may include any of the types of components and functionality described earlier in reference to the O/S 1122 and the DBMS 1124. In certain example embodiments, the DBMS 1144 may be a lightweight DBMS designed for a mobile device. Any of the components depicted as being stored in data storage 1138 may include any combination of software, firmware, and/or hardware. The software and/or firmware may include computer-executable instructions (e.g., computer-executable program code) that may be loaded into the memory 1132 for execution by one or more of the processor(s) 1130 to perform any of the operations described earlier in connection with similar named applications or program modules.

It should be appreciated that the program modules depicted in FIG. 11 as being stored in the data storage 1118 or the data storage 1138 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the service provider system 1102, hosted locally on the user device 1104, and/or hosted on other computing device(s) accessible via the network(s) 1108, may be provided to support functionality provided by the modules depicted in FIG. 11 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of servers in the service provider system 1102 in accordance with any suitable computing model such as, for example, a client-server model, a peer-to-peer model, and so forth. In addition, any of the functionality described as being supported by any of the modules depicted in FIG. 11 may be implemented, at least partially, in hardware and/or firmware across any number of devices.

It should further be appreciated that the service provider system 1102 and/or the user device 1104 may include alternate and/or additional hardware, software, or firmware components beyond those described or depicted without departing from the scope of the disclosure. More particularly, it should be appreciated that software, firmware, or hardware components depicted as forming part of the service provider system 1102 or the user device 1104 are merely illustrative and that some components may not be present or additional components may be provided in various embodiments. While various illustrative modules have been depicted and described as software modules stored in data storage 1118 or software modules stored in data storage 1138, it should be appreciated that functionality described as being supported by such modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 700-1000 may be performed by a service provider system 1102 having the illustrative configuration depicted in FIG. 11 or by a user device 1104 having the illustrative configuration depicted in FIG. 11, or more specifically, by one or more program modules, engines, applications, or the like executing on such a system or device. It should be appreciated, however, that such operations may be implemented in connection with numerous other device configurations.

The operations described and depicted in the illustrative methods of FIG. 7-10 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 7-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for authenticating access to a service provider system, the method comprising:
    sending, by a user application executing on a user device, an authentication image to the service provider system, the authentication image comprising first data generated in response to user input, second data generated by the user application, and third data generated by the service provider system; receiving, by the user application, an indication from the service provider system that access to a user account has been authenticated based at least in part on the authentication image,
    wherein the first data is generated by:
        presenting a grid having a plurality of user-selectable cells to the user;
        receiving a user selection of one or more of the plurality of the user-selectable cells; and
        generating a matrix object based at least in part on the user selection of the at least a portion of the user-selectable cells.

2. The computer-implemented method of claim 1, wherein the matrix object comprises a plurality of digits, and wherein each digit comprises a designated number of cells of the plurality of user-selectable cells.

3. The computer-implemented method of claim 1, further comprising:
    receiving a bounded matrix object image from the service provider system, the bounded matrix object image comprising the matrix object and at least a portion of the third data; and
    storing the bounded matrix object image in local storage of the user device.

4. The computer-implemented method of claim 3, wherein the at least a portion of the third data comprises at least one of an identifier associated with the service provider system, a datestamp, a timestamp, or a geo-location identifier.

5. The computer-implemented method of claim 4, wherein the at least a portion of the third data further comprises a plurality of boundary indicators that indicate a boundary of the matrix object, and wherein a first boundary indicator of the plurality of boundary indicators indicates an orientation of the matrix object.

6. The computer-implemented method of claim 3, further comprising:
- sending, by the user application, a request for a code and a background image to the service provider system;
- receiving, by the user application, the code and the background image from the service provider system;
- executing, by the user application, a digital imprint signature algorithm using the code to generate a digital imprint signature, wherein the second data comprises the digital imprint signature; and
- combining the bounded matrix object image, the digital imprint signature, and the background image to form the authentication image.

7. A client device for authenticating access to a service provider system, the client device comprising:
- at least one memory storing computer-executable instructions; and
- at least one processor configured to access the at least one memory and execute the computer-executable instructions to:
  - send, by a user application executing on the client device, an authentication image to the service provider system, the authentication image comprising first data generated in response to user input, second data generated by the user application, and third data generated by the service provider system; and
  - receive, by the user application, an indication from the service provider system that access to a user account has been authenticated based at least in part on the authentication image,
- wherein the first data is generated by:
  - presenting a grid having a plurality of user-selectable cells to the user;
  - receiving a user selection of one or more of the plurality of the user-selectable cells; and
  - generating a matrix object based at least in part on the user selection of the at least a portion of the user-selectable cells.

8. The client device of claim 7, wherein the matrix object comprises a plurality of digits, and wherein each digit comprises a designated number of cells of the plurality of user-selectable cells.

9. The client device of claim 7, wherein the at least one processor is further configured to execute the computer-executable instructions to:
- receive a bounded matrix object image from the service provider system, the bounded matrix object image comprising the matrix object and at least a portion of the third data; and
- store the bounded matrix object image in local storage of the user device.

10. The client device of claim 9, wherein the at least a portion of the third data comprises at least one of an identifier associated with the service provider system, a datestamp, a timestamp, or a geo-location identifier.

11. The client device of claim 10, wherein the at least a portion of the third data further comprises a plurality of boundary indicators that indicate a boundary of the matrix object, and wherein a first boundary indicator of the plurality of boundary indicators indicates an orientation of the matrix object.

12. The client device of claim 9, wherein the at least one processor is further configured to execute the computer-executable instructions to:
- send, by the user application, a request for a code and a background image to the service provider system;
- receive, by the user application, the code and the background image from the service provider system;
- execute, by the user application, a digital imprint signature algorithm using the code to generate a digital imprint signature, wherein the second data comprises the digital imprint signature; and
- combine the bounded matrix object image, the digital imprint signature, and the background image to form the authentication image.

13. A computer program product for authenticating access to a service provider system, the computer program product comprising a non-transitory storage medium readable by a processing circuit, the storage medium storing instructions executable by the processing circuit to cause a method to be performed, the method comprising:
- sending an authentication image to the service provider system, the authentication image comprising first data generated in response to user input, second data generated by a user application, and third data generated by the service provider system; and
- receiving an indication from the service provider system that access to a user account has been authenticated based at least in part on the authentication image,
- wherein the first data is generated by:
  - presenting a grid having a plurality of user-selectable cells to the user;
  - receiving a user selection of one or more of the plurality of the user-selectable cells; and
  - generating a matrix object based at least in part on the user selection of the at least a portion of the user-selectable cells.

14. The computer program product of claim 13, the method further comprising:
- receiving a bounded matrix object image from the service provider system, the bounded matrix object image comprising the matrix object and at least a portion of the third data; and
- storing the bounded matrix object image in local storage of a user device.

15. The computer program product of claim 14, wherein the at least a portion of the third data comprises at least one of an identifier associated with the service provider system, a datestamp, a timestamp, or a geo-location identifier.

16. The computer program product of claim 15, wherein the at least a portion of the third data further comprises a plurality of boundary indicators that indicate a boundary of the matrix object, and wherein a first boundary indicator of the plurality of boundary indicators indicates an orientation of the matrix object.

17. The computer program product of claim 14, the method further comprising:
- sending a request for a code and a background image to the service provider system;
- receiving the code and the background image from the service provider system;
- executing, by the user application, a digital imprint signature algorithm using the code to generate a digital imprint signature, wherein the second data comprises the digital imprint signature; and
- combining the bounded matrix object image, the digital imprint signature, and the background image to form the authentication image.

* * * * *